United States Patent
Brasseur et al.

(10) Patent No.: US 6,619,589 B2
(45) Date of Patent: Sep. 16, 2003

(54) FLIGHT CREW AND ATTENDANT REST ENVIRONMENTAL CONTROL SYSTEM

(75) Inventors: Andre G. Brasseur, Everett, WA (US); Paul A. Guilford, Bellevue, WA (US); Frank P. Brady, Monroe, WA (US); Cheh-Min J. Su, Kirkland, WA (US); Charles A. Fieldson, Bothell, WA (US); Michael L. Trent, Mukilteo, WA (US); John J. Stevens, Seattle, WA (US); Stephen E. Izbicki, Kirkland, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/215,344

(22) Filed: Aug. 8, 2002

(65) Prior Publication Data

US 2003/0141413 A1 Jul. 31, 2003

Related U.S. Application Data

(63) Continuation-in-part of application No. 10/058,819, filed on Jan. 28, 2002.

(51) Int. Cl.$^7$ .............................................. B64D 13/00
(52) U.S. Cl. ...................... 244/118.5; 454/76; 454/103; 454/104; 454/105
(58) Field of Search ............................. 244/163, 118.5, 244/118.6, 125, 128, 129.2; 454/69–76, 83, 87, 104, 141, 142, 145, 234, 241, 237, 244, 369, 103, 105

(56) References Cited

U.S. PATENT DOCUMENTS 2,937,011 A * 5/1960 Brahm ...................... 165/203
3,711,044 A * 1/1973 Matulich .................. 244/118.5
4,546,939 A * 10/1985 Cronin ..................... 244/118.5
4,706,908 A * 11/1987 Huffman et al. .......... 244/118.5
4,814,579 A * 3/1989 Mathis et al. ................ 219/202
5,516,330 A * 5/1996 Dechow et al. ................ 454/74
5,791,982 A * 8/1998 Curry et al. .................. 454/74
6,306,032 B1 * 10/2001 Scheffler et al. .............. 454/71
6,375,849 B1 * 4/2002 Crabtree et al. ............ 210/652
6,449,963 B1 * 9/2002 Ng et al. ........................ 62/86
6,491,254 B1 * 12/2002 Walkinshaw et al. .... 244/118.5

FOREIGN PATENT DOCUMENTS

GB         2166542 A  *  5/1986    ........... B64D/13/00

* cited by examiner

*Primary Examiner*—Charles T. Jordan
*Assistant Examiner*—Stephen A Holzen
(74) *Attorney, Agent, or Firm*—Black Lowe & Graham PLLC

(57) ABSTRACT

The present invention provides a temperature control system for an aircraft ventilation system that couples with existing aircraft upstream ventilation system architecture and downstream ventilation system architecture. The temperature control system includes an air duct arranged to receive a volume of ventilation air from the upstream ventilation system architecture and transfer the volume of air to the downstream ventilation system architecture. A heater is arranged to heat the ventilation air. A controller is arranged to control the heater responsive to a comparison of the actual temperature of the ventilation air to a desired range of temperatures. The controller maintains the actual ventilation air temperature within the predetermined range of temperatures such that formation of ice is minimized in the aircraft ventilation system. An exhaust shutoff valve between the air distribution system and the lavatory/galley ventilation system provides for ventilation in the event smoke is detected.

16 Claims, 9 Drawing Sheets

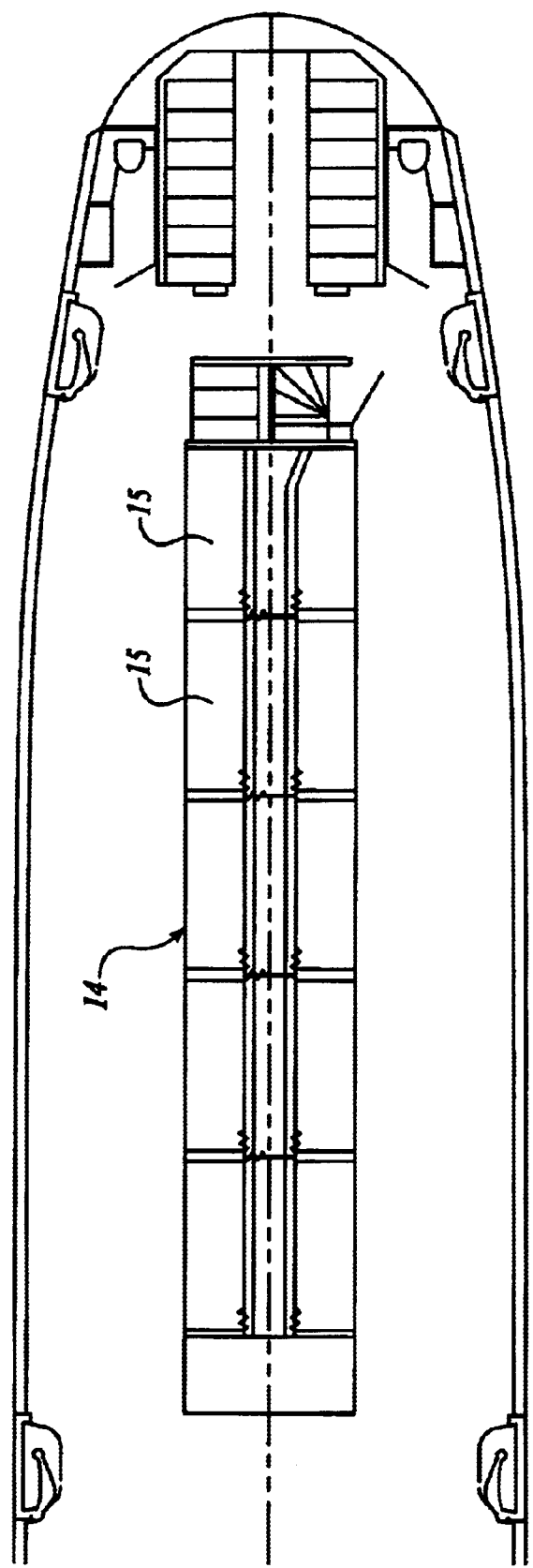

FLIGHT CREW AND ATTENDANT REST ENVIRONMENTAL CONTROL SYSTEM

This application is a continuation-in-part of application Ser. No. 10/058,819 filed on Jan. 28, 2002.

FIELD OF THE INVENTION

This invention relates generally to aircraft ventilation systems and, more specifically, ventilation systems for air crew and flight attendant rest areas.

BACKGROUND OF THE INVENTION

Commercial aircraft around the world often undertake flights in excess of eight hours in length. Because of a need for adequate rest facilities for the flight crew and cabin crew members, rest areas are sometimes provided within the aircraft for use by the crew members while the aircraft is in flight or on the ground. Typically, the rest areas are relatively small, such as single person units remotely located in the vicinity of the aircraft's cockpit.

Ventilation systems in the rest areas are typically tied directly into the aircraft's main ventilation system. Obtaining and maintaining a habitable environment within the rest areas and complying with safety regulations has been a problem due to a number of factors, including a relatively large size of the main ventilation system of the aircraft, wide ranging atmospheric environmental conditions, the relatively small size of the rest areas, and the location of the rest areas in remote parts within the aircraft.

Cool air pulled from the aircraft's main air conditioning pack is often excessively cold for relatively small rest areas. If the aircraft's main ventilation system is continually running, the rest area is too cold to occupy until the rest area can be adequately heated. Conversely, if the ventilation system is shut down for any appreciable length of time, especially in warmer climates, the rest areas can become too hot to occupy. In either case, the rest areas and the items within the rest area represent a thermal mass that increases the time required to heat or cool the space to a habitable level. This additional uninhabitable period reduces the amount of time a crew member can rest, potentially preventing some crew members from receiving enough rest.

Another problem with pulling air directly from the main air conditioning pack is the adverse effect on ventilation system components. More specifically, under certain atmospheric conditions, such as those encountered on the ground or in flight below 25,000 feet, icing can occur in the ventilation system. Icing is particularly likely under warm, humid conditions in which moist air drawn from outside the aircraft is cooled and freezes within the ductwork. Icing can detrimentally affect operation of shut-off valves and other components downstream from the air conditioning packs, creating an undesirable or uncertifiable ventilation condition. Frozen valves are particularly troublesome when the valves operate a system to exhaust smoke from the cabin.

Therefore, there is an unmet need for a system for maintaining habitable conditions in aircraft crew rest areas and to prevent freezing of valves that operate critical exhaust systems.

SUMMARY OF THE INVENTION

The invention provides a reliable system for controlling crew rest air ventilation temperature such that the crew rest area climate is continually maintained in a habitable condition on the ground and at all flight altitudes.

The present invention provides a temperature control system for an aircraft ventilation system that couples with existing aircraft upstream ventilation system architecture and downstream ventilation system architecture. The temperature control system includes an air duct arranged to receive a volume of ventilation air from the upstream ventilation system architecture and transfer the volume of air to the downstream ventilation system architecture. A heater is used to heat the ventilation air, while a temperature sensor senses the temperature of the ventilation air. A controller maintains the actual ventilation air temperature such that formation of ice is minimized in the aircraft ventilation system.

In accordance with further aspects of the invention, the present invention provides a method of preventing icing conditions in an aircraft ventilation system. The method includes receiving ventilation air from an upstream ventilation system architecture of an aircraft ventilation system, passing the ventilation air through a heater at a first location and sensing an actual ventilation air temperature at a second location downstream from the first location. A controller controls the heater to maintain the actual air temperature. The continual sensing, comparing and controlling of the air ventilation temperature minimizes the formation of ice in the aircraft ventilation system.

BRIEF DESCRIPTION OF THE DRAWINGS

The preferred and alternative embodiments of the present invention are described in detail below with reference to the following drawings.

FIG. 2A is a plan view of a representative overhead attendant or crew rest;

DETAILED DESCRIPTION OF THE INVENTION

Figure 1:
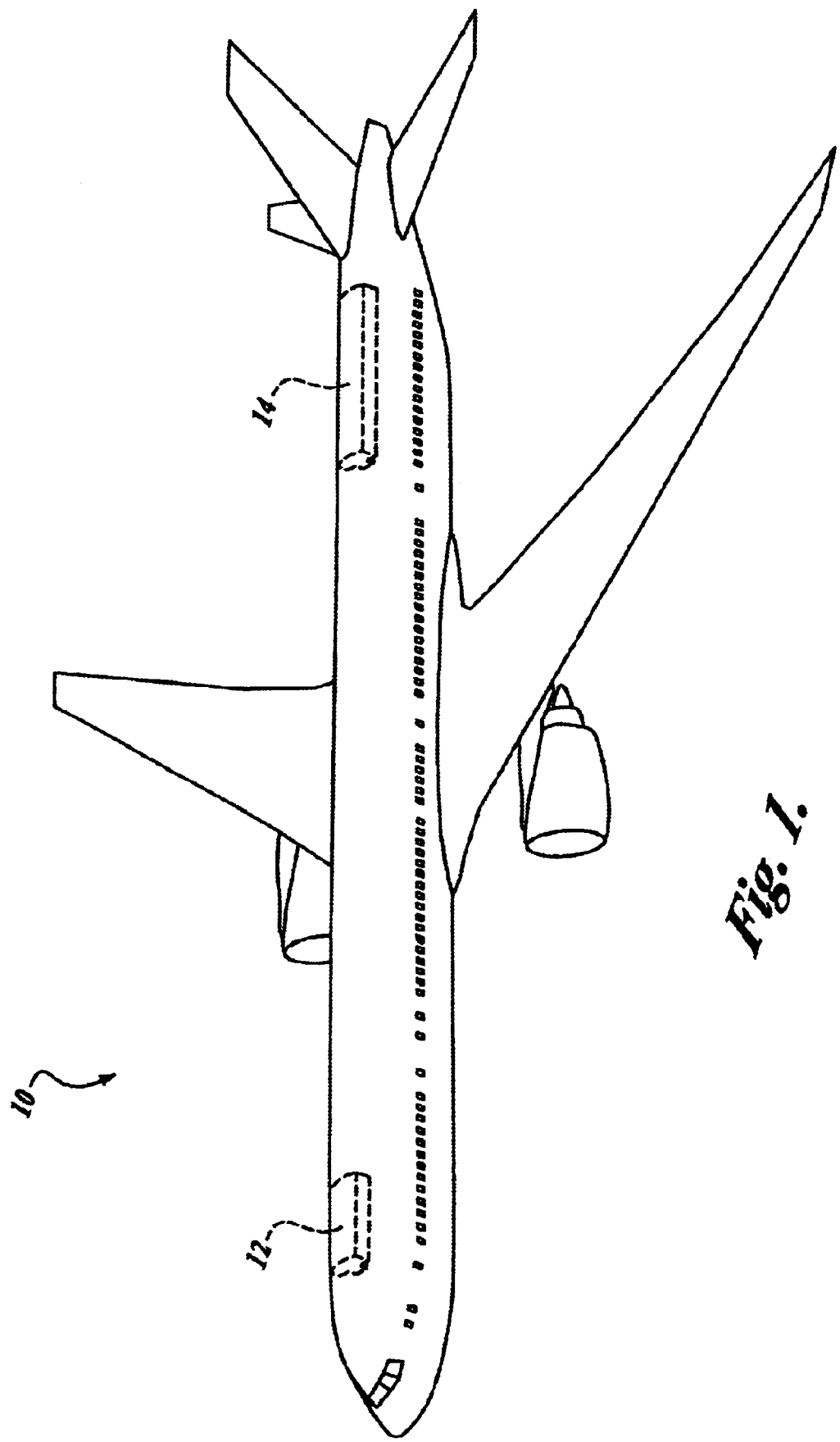
FIG. 1 is a perspective view of a representative aircraft having an overhead flight crew rest and an overhead flight attendant rest.

FIG. 1 illustrates a representative aircraft having overhead attendant and crew resets. In the example illustrated in FIG. 1, a Boeing 777-300ER is shown. The present crew and attendant rest environmental control system, however, may be used in any other aircraft. The aircraft 10 as illustrated includes both an overhead flight crew rest 12 and an overhead flight attendant rest 14. As shown, both the crew rest 12 and flight attendant rest 14 are positioned overhead, that is, in the crown of the aircraft and above the main passenger cabin. The crew rest 12 and attendant rest 14 may alternatively be located in any other position within the aircraft, and need not be in an overhead configuration. Likewise, while this description will often refer to separate crew rests and attendant rests because they are both separately included in a preferred embodiment, the concepts of the invention are interchangeable. Consequently, the present system may be employed in an aircraft having one or more rest areas located in any portion of the aircraft, regardless of whether any such rest area is designated for crew, flight attendants, or passengers.

Figure 2B:
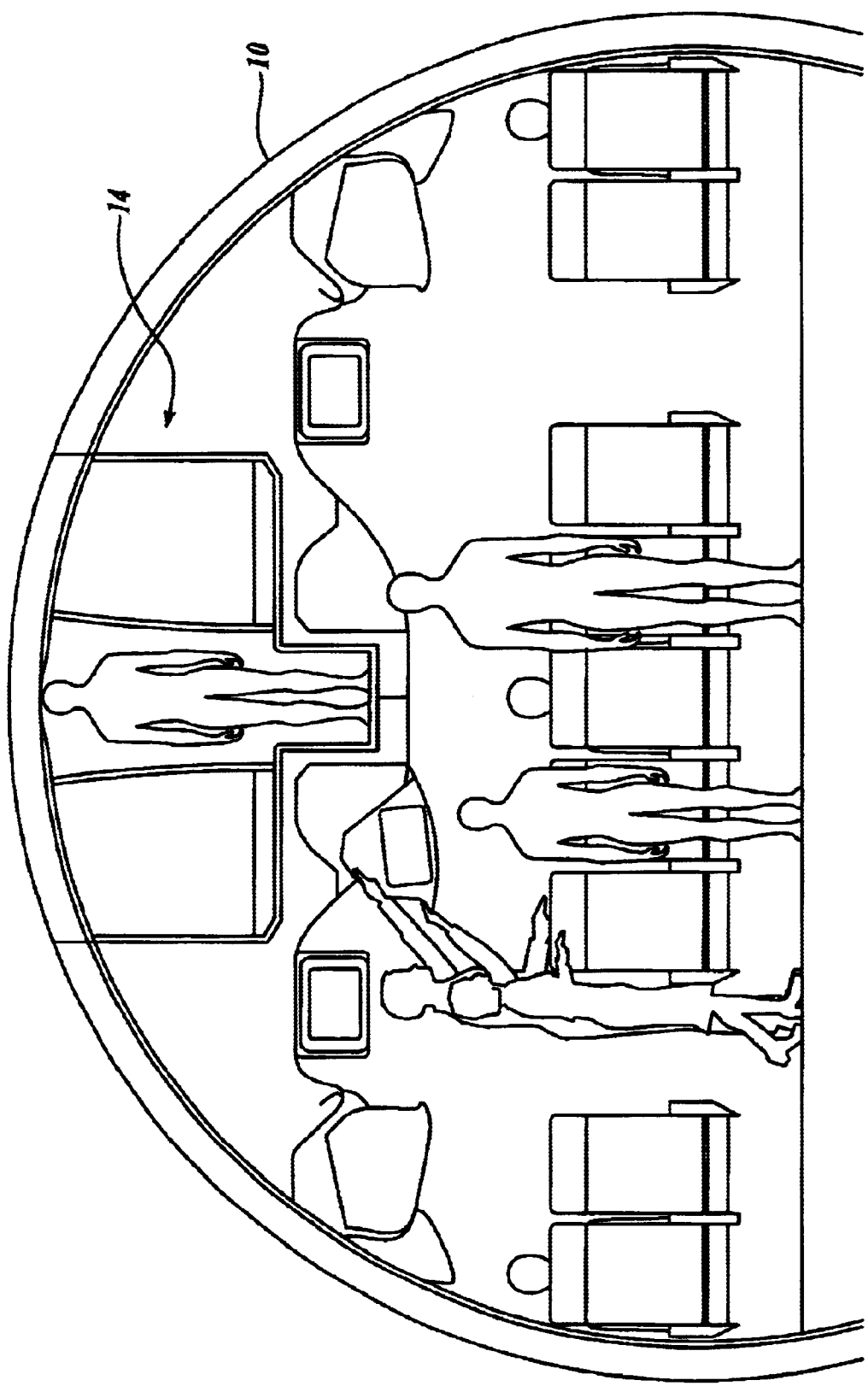
FIG. 2B is a front view of a representative overhead attendant or crew rest.

FIGS. 2A and 2B further illustrate various aspects of a preferred crew or attendant rest. As shown in FIG. 2A, an overhead rest can include any number of bunks 15 or other berths, changing areas, and other features. FIG. 2B illustrates the manner in which an overhead rest, in this case representatively an attendant rest 14, can be incorporated into the crown of an aircraft 10.

Preheating System

Figure 3:
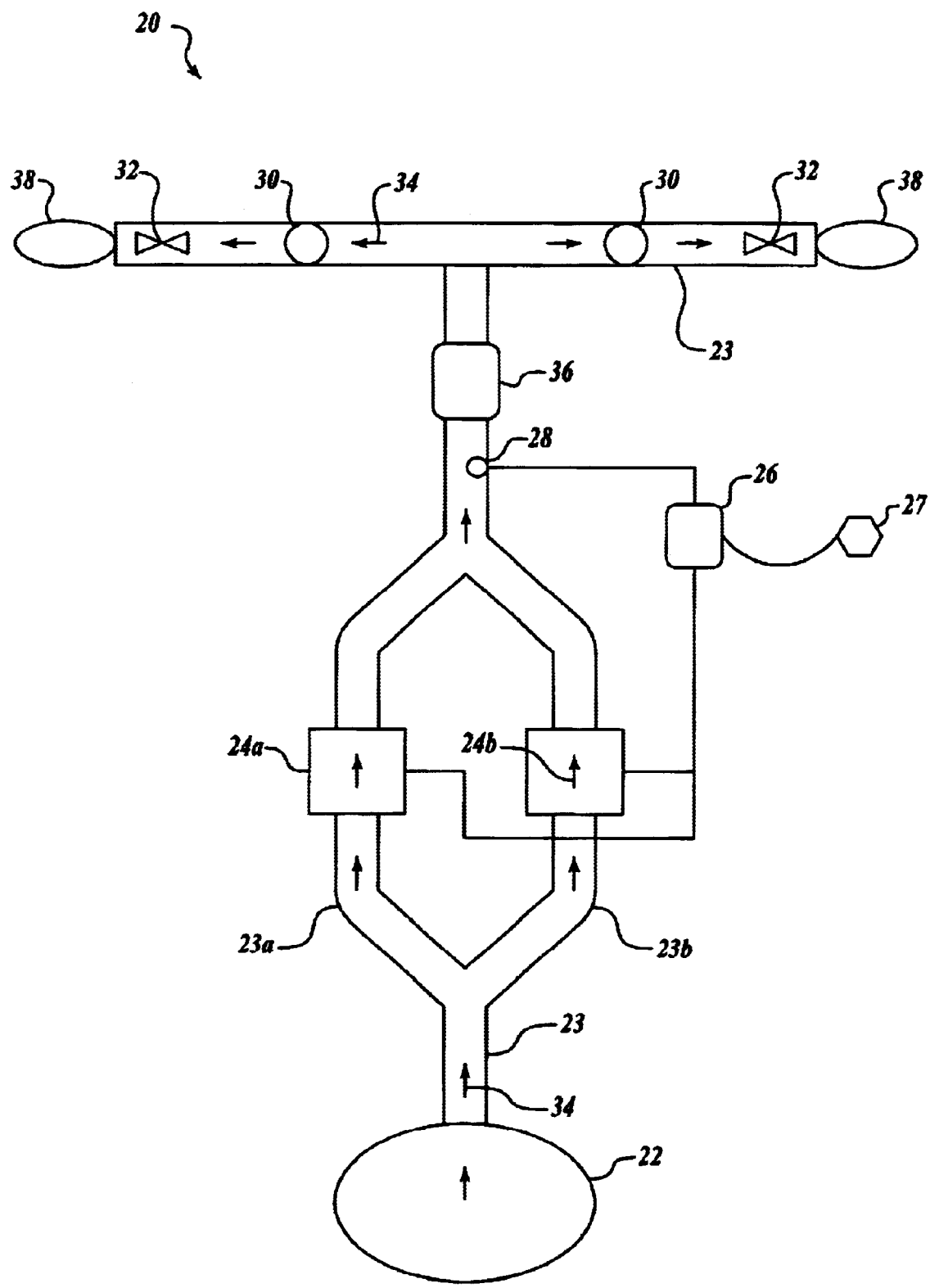
FIG. 3 is a schematic diagram of the pre-heating system.
Figure 4:
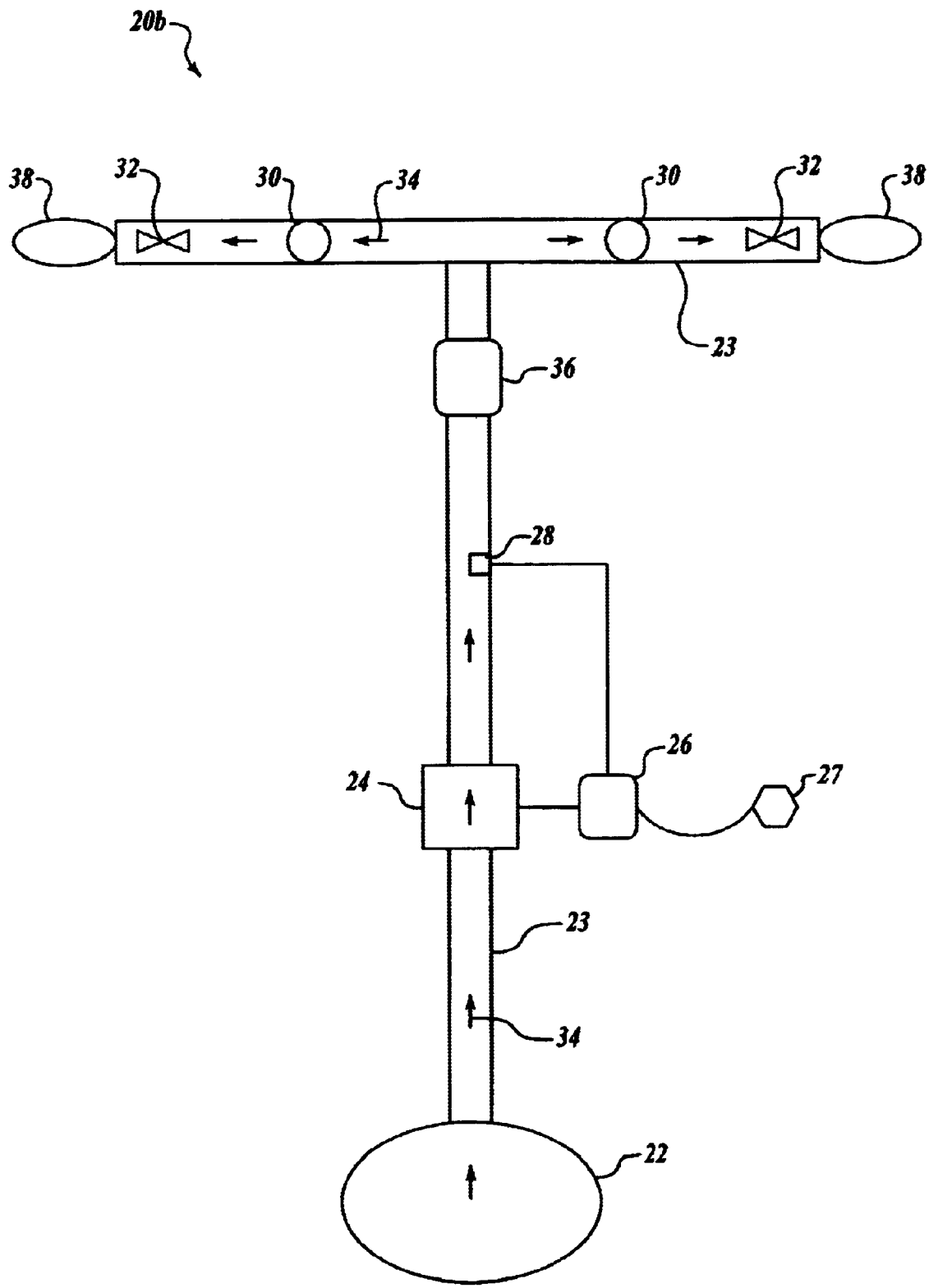
FIG. 4 is a schematic diagram of an alternative pre-heating system.

By way of overview and with reference to FIGS. 3 and 4, one aspect of a presently preferred preheating system includes a temperature control system 20 that is adaptable to an aircraft's upstream and downstream ventilation system architectures 22 and 38, respectively. The system 20 includes an in-line heater 24 for heating ventilation air passing therethrough; a temperature sensor 28 downstream from the heater 24 for determining actual ventilation air temperature; a controller 26 in electrical communication with the temperature sensor 28 and the heater 24, for controlling the heater 24 such that a desired downstream air temperature is maintained; a system fault indicator 27 electrically coupled to the controller 26 for providing an alert; and at least one in-line screen 30 for preventing ice and the like from passing further downstream. In an alternative embodiment of the present invention as shown in FIG. 4, a humidifier 36 may be included with the control system 20 to increase ventilation air moisture content if desired.

Initially, conditioned air is received by the control system 20 from the upstream ventilation system architecture 22 in the direction indicated by air flow direction 34. The upstream system architecture 22 provides a source of air from any of a variety of sources such as recirculated air, air drawn from outside, or a mixture of the two. The air from the upstream ventilation system architecture 22 is commonly provided at temperatures well below 20 degrees Fahrenheit, and is generally controlled using the present preheating system such that the maximum air temperature entering the control system is about 40 degrees Fahrenheit.

In the embodiment of FIG. 3, parallel air supply ducts 23*a* and 23*b* are used with parallel heaters 24*a* and 24*b* in the duct branches 23*a* and 23*b*. Additionally, the parallel ducts 23*a* and 23*b* are re-joined to form a single duct 23 upstream of the temperature sensor 28. Other duct architectures are within the scope of this invention. Likewise, a plurality of temperature sensors 28 can be used, either as redundant sensors in a single duct or as single sensors in each branch of multi-branch ducts.

The heaters 24 are suitably 2.25 kW in-line heaters. An exemplary heater is a "supplemental air heater" produced by Goodrich Aerospace, PN 4E3239-1. This heater allows for efficient thermal transfer from the heater to the passing air without excessively impeding air movement. Other heaters of different power ratings may be used as desired for a particular application.

The temperature sensor 28 is suitably a standard temperature sensor such as a thermocouple or thermister. An exemplary temperature sensor is manufactured by Hamilton Standard, PN 810211-2. The temperature sensor 28 may be located as desired, provided adequate mixing occurs depending upon the architecture of the duct 23 and mass flow rate of the ventilation air. As discussed above, in a presently preferred embodiment, the temperature sensor 28 is located downstream from the heater 24 to ensure that the heater elevates the air to the proper temperature.

In a presently preferred embodiment, the controller 26 is suitably an analog controller. However, a digital controller is considered within the scope of this invention. An exemplary controller 26 is made by Goodrich Aerospace, PN 4E4131-1. The controller 26 is in constant electrical communication with the temperature sensor 28 and the heaters 24. The controller 26 is pre-programmed to connect or disconnect electrical power to or from the heaters 24 based upon a comparison of actual air temperature sensed by the temperature sensor 28 with a desired programmable air temperature range. The controller 26 is programmed to actuate the heaters 24 in order to maintain an air temperature above about 35 degrees Fahrenheit. Preferably, the controller is programmed to maintain the air temperature in a range between about 35 degrees Fahrenheit to about 37 degrees Fahrenheit. The controller 26 also functions as a system fault sensor for the elements within the control system 20, for example the heater 24 and temperature sensor 28. The controller 26 electrically communicates the element's status to a remote system fault indicator 27, discussed in more detail below.

A shut-off valve 32 is suitably interposed within the duct 23 downstream from the ice screen 30. The shut-off valve 32 may suitably be any shut-off valve, such as a ball or gate valve. An exemplary shut-off valve 26 is produced by Nord Micro, PN 4063-20605-01. The shut-off valve 32 prevents ventilation air from entering the downstream ventilation system architecture 38 when the shut-off valve 32 is closed. By maintaining air temperature above freezing temperature, the system 20 provides a fully automated temperature control system for a ventilation system. In particular, operation of the system 20 precludes ice formation within the duct 23 and, specifically, on the supply shut-off valves 32.

A humidifier may be added to the system in order to increase air moisture content, if desired. As shown in FIG. 4, in an alternative embodiment, the humidifier 36 is suitably located downstream from the temperature sensor 28 and upstream from the ice screen 30 and shut-off valves 32. When the humidifier 36 is used, it will be appreciated that the pre-programmed temperature range of the controller 26 may need to be increased to a range of higher temperatures than the range of temperatures when the humidifier 36 is absent. This range of higher temperatures accommodates downstream thermal effects of added moisture. An acceptable example of such higher temperatures is a range of 50–52 degrees Fahrenheit.

The system fault indicator 27 is suitably electrically coupled to the controller 26 and provides an indicator such as a light or audible alarm if the controller 26 determines a fault exists within the control system 20. An exemplary system fault indicator 27 is produced by Cory, PN 18539-549. Connection and logic controllers are used to notify the crew of any independent or collective failure of the system's components.

Figure 5:
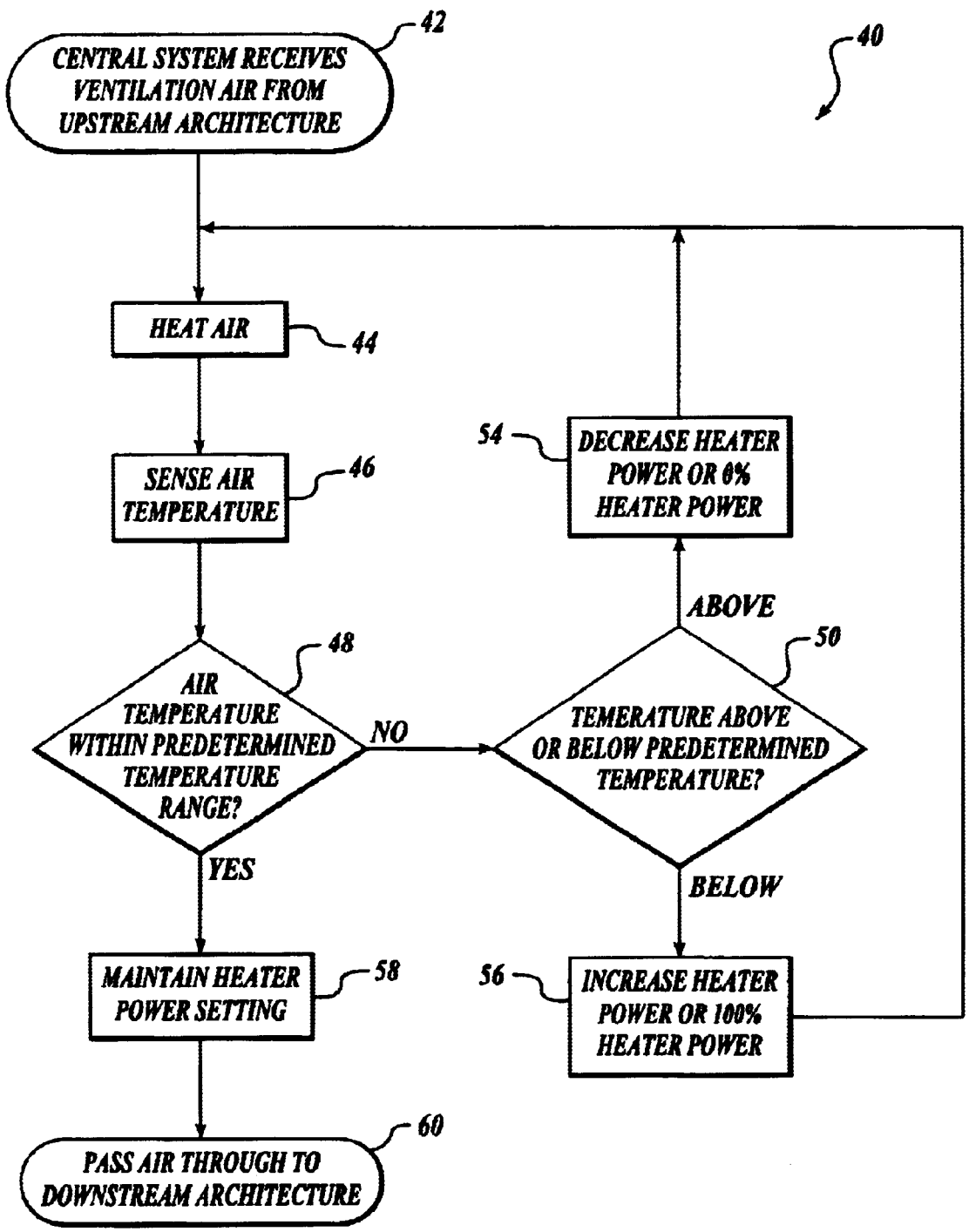
FIG. 5 is a flowchart of a method for preheating air.

FIG. 5 shows a flow diagram for a routine 40 for operating the preheating control system 20. Ventilation air is received by the control system 20 from the upstream ventilation architecture 22, at a block 42. As the air is received, the air is heated, at a block 44. Subsequently the air temperature is sensed at a block 46.

The sensed air temperature is communicated to the controller 26 and a comparison is made of actual air temperature and a desired air temperature range at a block 48. If the actual air temperature is within the desired air temperature range the control system 20 maintains the heater power settings, at a block 58. If the temperature is not within the desired air temperature range, another determination must be made. More specifically, a determination is made whether the actual temperature is above or below the desired air temperature range at a block 50. If the actual air temperature is above the desired air temperature range, then the controller 26 decreases power or turns the heater 24 fully off, at a block 54. Conversely, if the actual air temperature is below the desired air temperature range, at a block 56, the controller 26 increases power or turns the heater 24 fully on. This iterative logic loop continues until the actual air temperature is within the desired air temperature range.

Trim Heating System

Figure 6:
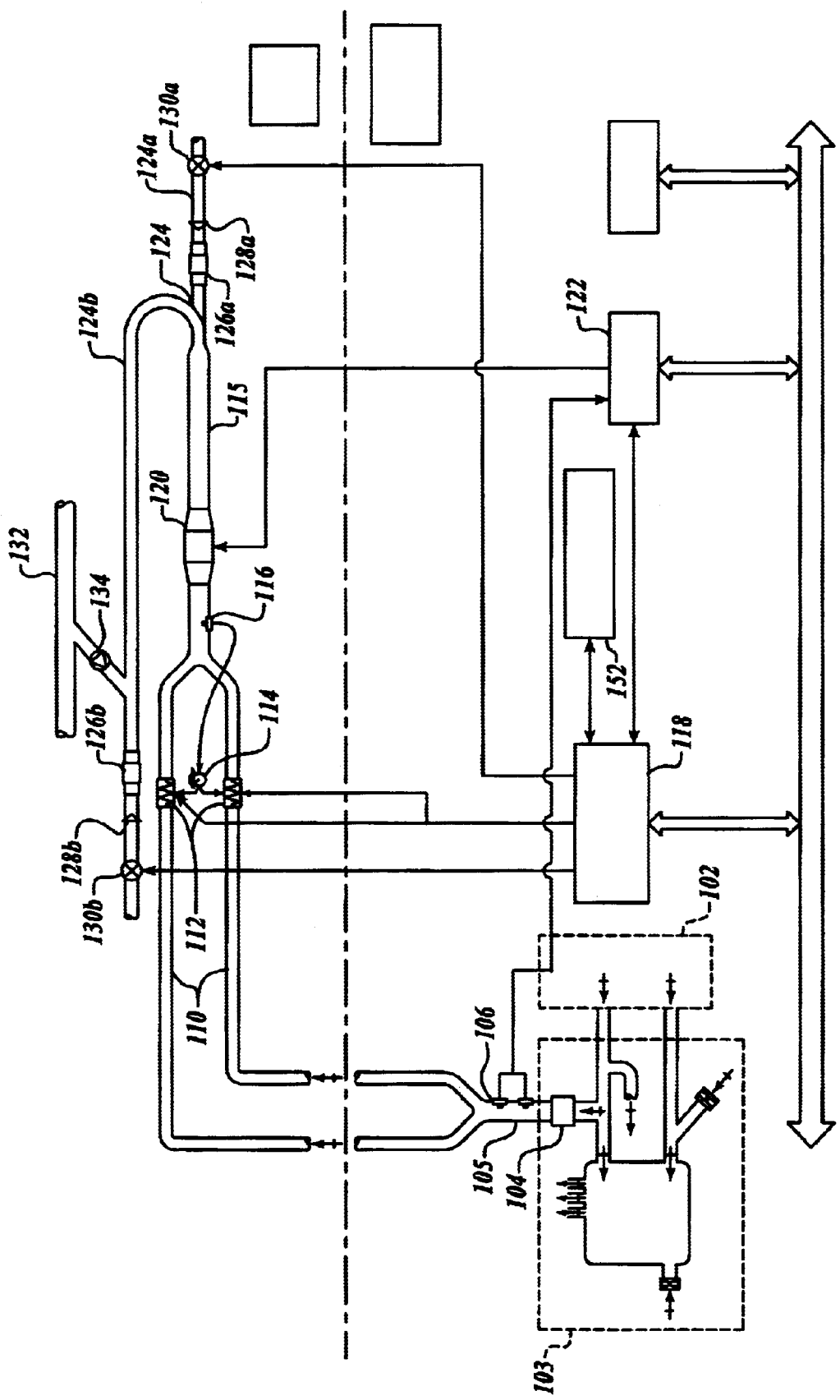
FIG. 6 is a schematic diagram of an aircraft air distribution system.

In addition to the preheating system that prevents icing of valves and other components in the system, the invention includes a trim heating system for controlling the temperature locally in the crew or attendant rest. FIG. 6 illustrates a functional schematic of an aircraft air distribution system employing the preheating system just prior to the trim heating system. Air from outside the aircraft is drawn into the aircraft by an air pack 102, which serves as a source of air. The pack 102 performs a variety of functions, such as compressing the relatively thin air drawn from outside the aircraft, heating or cooling the air, and pumping it through the ductwork. Preferably, there are multiple packs 102, including a left and right pack located on opposite sides of the aircraft.

The air distribution system also includes a mix manifold 103 to mix fresh air with air recirculated from the cabin. Air ultimately delivered to the attendant or crew rests can comprise either fresh air or air mixed with recirculated air. In a preferred embodiment, the crew or attendant rests are fed only fresh air delivered from only one of the two air packs 102.

After the air is drawn in by the pack 102, it travels through a central duct 105 to a muffler 104 containing baffles or other noise abating structures. The air continues through ductwork in the direction of arrows provided in FIG. 6 to a pair of temperature sensors 106. Only a single temperature sensor need be used, but multiple sensors are preferred for reliability and redundancy. The sensors 106 are in communication with the cabin temperature controller, or CTC 122, which monitors the air traveling through the ductwork and maintains the air temperature at a maximum of 40 degrees F. when a crew or attendant rest is installed and either shutoff valve 130a or 130b is opened and supplying air to the crew or attendant rest.

In the embodiment of FIG. 6, as with that of FIG. 3, the duct 105 splits into a pair of parallel ducts 110, each having a heater 112. The heaters 112 are in communication with the Electrical Load Management System, or ELMS 118, which monitors and provides power to various aircraft subsystems, including the heaters 112. An analog temperature controller 114 coupled to each of the heaters 112 operates the heaters 112 to provide more or less heat, or to turn off entirely if appropriate. The temperature controller 114 is further in communication with a temperature sensor 116 located downstream of the heaters 112 at a location downstream of where the parallel ducts 110 have rejoined to again form a single main duct 115. Thus, the temperature controller 114 causes the heaters 112 to provide more or less heat in response to the temperature sensed by the sensor 116.

Continuing downstream in the direction of airflow, an optional humidifier 120 is provided in communication with the air traveling through the main duct 115. The humidifier is controlled by the CTC 122 which instructs the humidifier 120 to raise or lower the humidity of the air through the ductwork as desired.

After the humidifier 120, the main duct 115 forms a wye 124, splitting the main duct 115 into two branches, 124a, 124b. The division of the main duct is used in the preferred embodiment so that the pre-heated and conditioned air can feed separated crew and attendant rests. Alternatively, the main duct may be divided to feed separate sections of a single rest or to perform other environmental functions.

Figure 7:
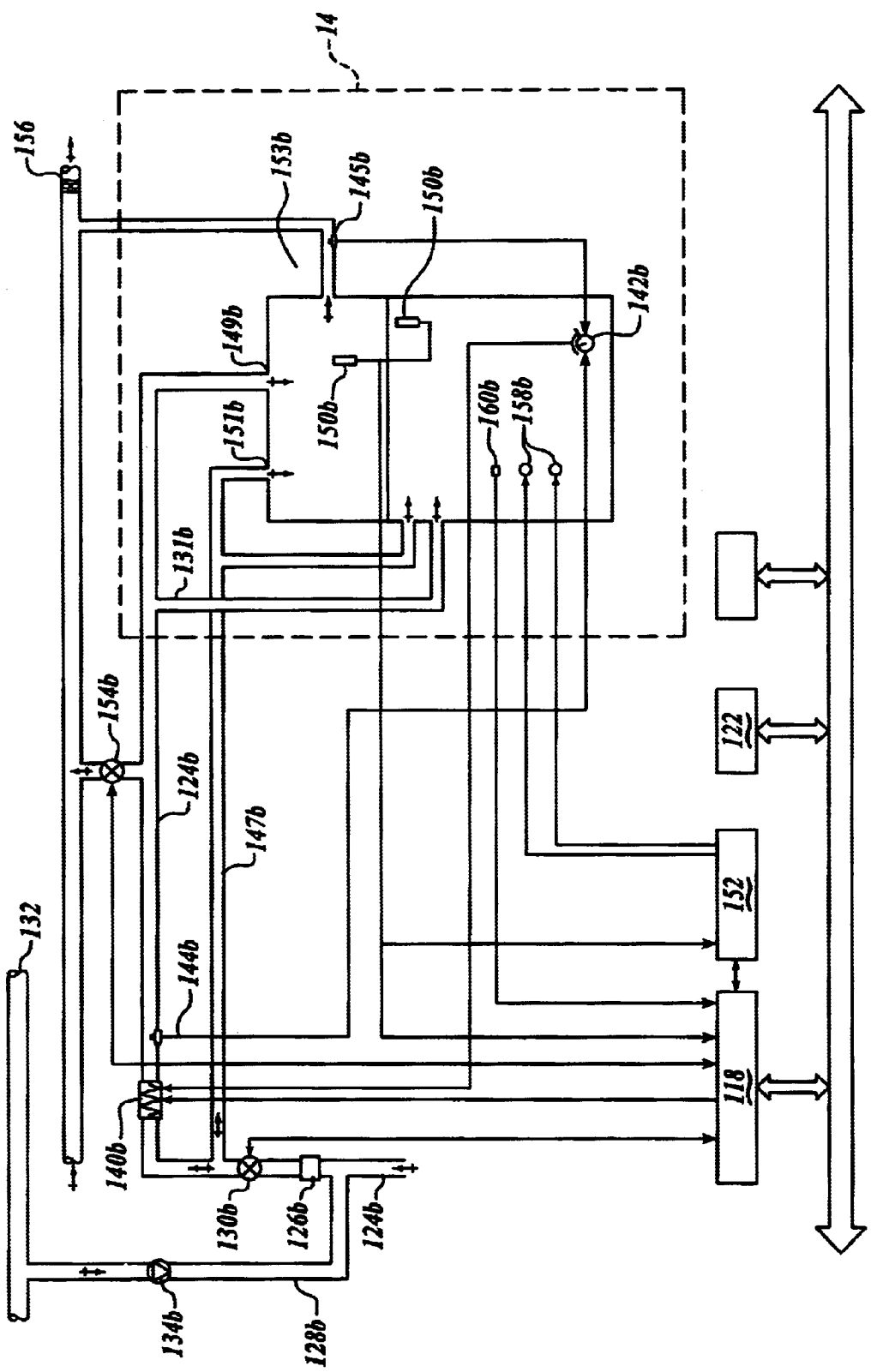
FIG. 7 is a schematic diagram of an aircraft attendant rest air distribution system.

The trim heating system essentially includes the components after the wye 124. After the wye 124, each of the branch ducts 124 a, b includes a muffler 126 a, b, an ice screen 128 a, b, and a shutoff valve 130 a, b. As best seen in FIG. 7, the air traveling through the attendant branch duct 124b is optionally blended with air fed by a recirculating supply duct 132. A check valve 134 joins the recirculating supply duct 132 to the attendant branch duct 124b.

Following the valve 130b, the air traveling through the attendant branch duct 124b encounters an attendant rest heater 140b and a downstream in-line temperature sensor 144b. The in-line temperature sensor 144b and the return air sensor, discussed below is in communication with an attendant rest temperature controller 142b, which a flight attendant may operate to control the temperature of the air entering the attendant rest 14. The temperature controller 142b indicates the temperature of the air in the attendant rest, as measured by the sensors 144b and 145b. The temperature controller 142b is also coupled to the attendant rest heater 140b to cause the heater to increase or decrease the temperature of the air.

In addition to the in-line temperature sensor 144b, the temperature controller 142b is coupled to the return air temperature sensor 145b. In the preferred embodiment, the return air sensor 145b is located in a duct joining the rest area to the lavatory/galley vent system 156, so that the sensor 145b is monitoring air that ultimately exits the aircraft. Alternatively, the return air sensor may be located in other areas, such as in a duct in the return air path 153b. Regardless of its precise location, the return air sensor 145b is configured to sense the temperature of moving air leaving the rest area, rather than static air within the rest area. In doing so, the controller 142b provides a faster response rate and more precise temperature control.

Ultimately, the air flowing through the main attendant duct 124b travels through one or more rest area ducts 131b and enters the attendant rest through one or more outlets 149 within the attendant rest 14.

A separate flow of air is provided in individual air outlets 151b, sometimes called "gasper" air. An air distribution duct 147b branches from the attendant branch duct 124b just beyond the valve 130b. Accordingly, the air traveling through the duct 147b has been preheated but bypasses the trim heating system. The duct ultimately enters the rest area via nozzles, diffusers, or other outlets 151b that are individually controllable to provide cool air and a measure of individual, localized temperature control.

A return air grill 153b is included within the rest area to draw air from the rest area and into a return air path. Though the air may be exhausted or returned in a variety of ways, in the preferred embodiment it is vented to the crown of the aircraft where it is drawn back to the mixing bay by recirculating fans.

One added feature of the present air distribution system is that it does not include a separate complete duct system to exhaust air from the attendant or crew rest in the event of fire. Instead, the lavatory and galley vent system is used to exhaust the air from the existing air distribution supply duct work using some of the same ducting that supplies air during normal operations. The attendant rest 14 includes one or more smoke detectors 150b in communication with a cabin systems monitor 152b. In the event smoke is sensed by a smoke detector 150b, the cabin systems monitor 152b triggers audible and visual alarms 158b such as horns and lights indicating the presence of fire and further that the air flow has been stopped. The cabin systems monitor also sends a signal to ELMS 118, which closes the air distribution valve 130b to stop the flow of air into the attendant rest 14. ELMS 118 also opens an exhaust valve 154b joining the attendant duct 124b (downstream of the distribution valve 130b) to the lavatory/galley ventilation system 156 and shuts off the heater 140b. By opening and closing the appropriate valves, the air flowing into the attendant rest is stopped and the exhaust system is operated to draw the smoke-filled air out of the attendant rest. Thus, the same ducts 124b and 131b that previously supplied air to the rest area are now drawing air from it. Once the emergency has cleared, an attendant or crew member can return the air flow to normal by triggering a reset switch 160b. The reset switch 160b is in communication with the cabin systems monitor 152, which receives a signal from the switch and instructs ELMS 118 to open and close valves and resume heating, as appropriate.

Figure 8:
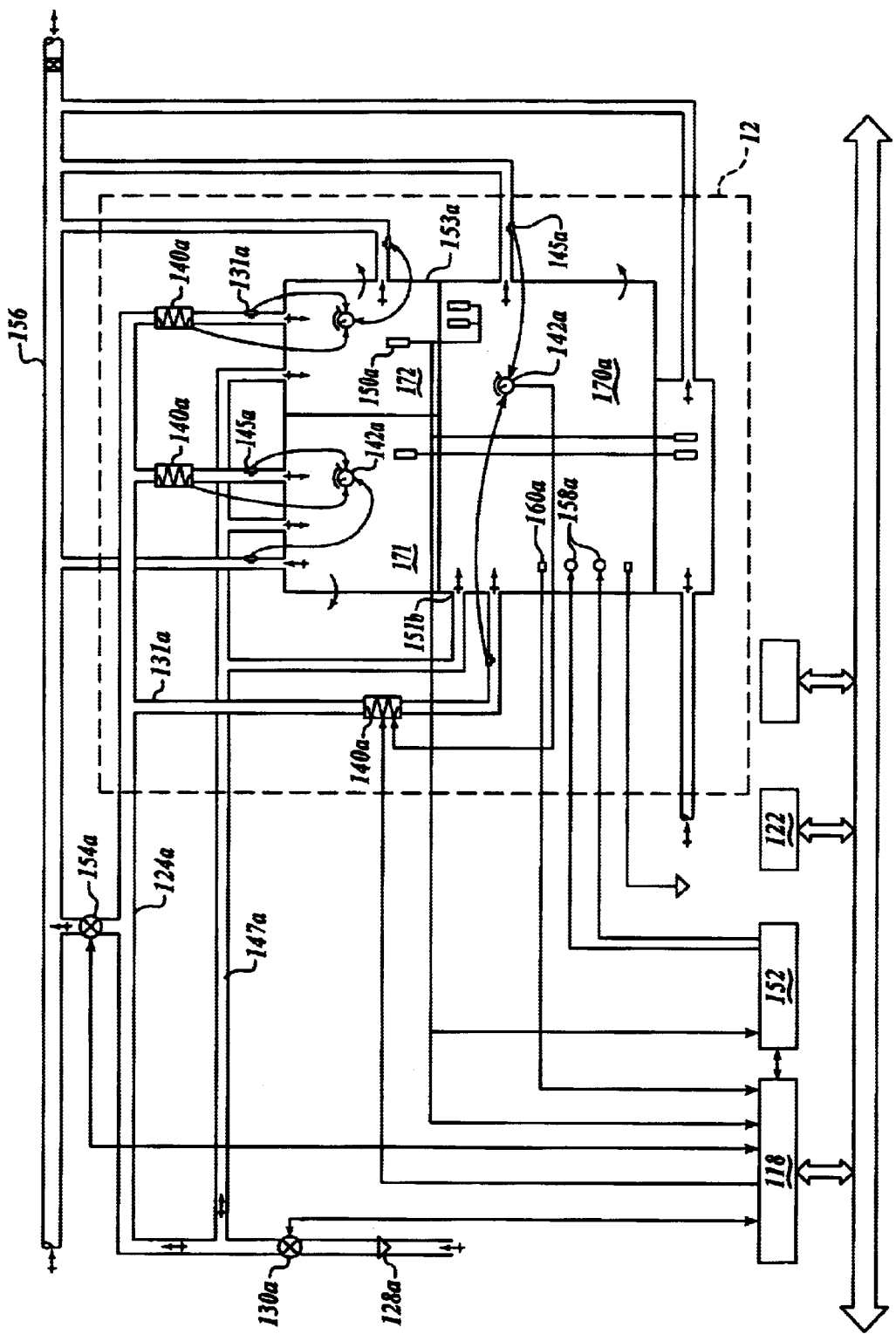
FIG. 8 is a schematic diagram of an aircraft crew rest air distribution system.

As best seen in FIG. 8, the main air duct 115 (shown in FIG. 6) also feeds a crew rest duct 124a having a muffler 126a, ice screen 128a, and shutoff valve 130a. The schematic illustration of FIG. 8 is nominally referred to as a crew rest while that of FIG. 7 is nominally called a flight attendant rest. Certainly either structure may house crew, flight attendants, or even passengers. Accordingly, this invention is not limited to use of any particular embodiment for only crew or attendants.

One principal difference between the embodiments of FIGS. 7 and 8 is that the embodiment of FIG. 8 includes separate heaters and temperature controllers associated with individual bunks within the crew rest 12. Thus, air travels through the main crew rest duct 124a, forming branches to feed each separate bunk or common area. As illustrated, the crew rest includes a common area 170, first bunk 171, and second bunk 172. The crew rest duct 124a forms a separate branch feeding each of the common area 170 and first and second bunks 170, 172, with a heater 140a and temperature sensor 144a in each branch. Temperature controllers 142a operate each of the heaters as with the embodiment of FIG. 7 (including feed back from a return air sensor 145a), except that a separate temperature controller is provided for each heater in each branch.

The crew rest further includes smoke detectors 150a, alarms 158a, and reset switches 160a that operate as described above with respect to FIG. 7. Thus, when smoke is detected, the main shutoff valve 130a is closed to stop the flow of air into the crew rest 12, and the exhaust valve 154a is opened, joining the crew rest duct 124a to the lavatory/galley ventilation system 156 to draw smoke-filled air from the crew rest 12 in doing so, air is exhausted from the crew rest through drafts 131a, 124a that previously supplied air to the crew rest.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An environmental control system for a rest area in an aircraft having an air source and an exhaust ventilation system, comprising:
    an air duct arranged to receive a volume of air from the air source and deliver it to the rest area, the air duct further being joined to the ventilation system;
    a first valve between the rest area and air source, the first valve operable to reduce the flow of air through the air duct, the valve further being located upstream of a point where the air duct joins the ventilation system;
    a second valve located between the ventilation system and the air duct, the second valve operable to allow air to be drawn from the rest area into the ventilation system;
    a system controller in communication with the first valve and second valve to cause the first valve or second valve to open or close in response to a rest area environmental condition; and
    a smoke or fire detector within the rest area and configured to provide a signal to the system controller when the detector detects the presence of smoke or fire in the rest area;
    wherein when the detector detects the presence of smoke or fire the system controller causes the first valve to substantially close and the second valve to open so that air within the rest area is drawn through at least a portion of the air duct and into the ventilation system.

2. The control system of claim 1, further comprising a heater configured to heat the air between the first valve and the rest area, and a temperature controller within the rest area, the temperature controller being configured to control the operation of the heater.

3. The control system of claim 2, wherein the system controller causes the heater to turn off when the detector detects the presence of smoke or fire.

4. The control system of claim 3, further comprising a preheater configured to heat the air upstream of the first valve.

5. An environmental control system for a rest area in an aircraft having an air source and an exhaust ventilation system, comprising:
    an air duct arranged to receive a volume of air from the air source and deliver the air to the rest area, the air duct further being joined to the ventilation system;
    a means for reducing the flow of air from the air source to the rest area;
    a means for allowing air to be drawn from the rest area into the ventilation system through at least a portion of the air duct;
    a means for controlling the means for reducing air flow and the means for allowing air to be drawn in response to a rest area environmental condition; and
    a smoke or fire detector within the rest area and configured to provide a signal to the means for controlling when the detector detects the presence of smoke or fire in the rest area;
    wherein when the detector detects the presence of smoke or fire the means for controlling causes air within the rest area to be drawn into the ventilation system.

6. The control system of claim 5, further comprising a heater configured to heat the air prior to entering the rest area, and a temperature controller within the rest area, the temperature controller being configured to control the operation of the heater.

7. The control system of claim 6, wherein the means for controlling causes the heater to turn off when the detector detects the presence of smoke or fire.

8. The control system of claim 7, further comprising a preheater configured to heat the air upstream of the first valve means for reducing the flow of air.

9. An environmental control system for a rest area in an aircraft having an air source and an exhaust ventilation system, comprising:

an air duct arranged to receive a volume of air from the air source and deliver it to the rest area through one or more rest area outlets connected to the air duct, the air duct further being joined to the exhaust ventilation system;

a first valve between the rest area and air source, the first valve operable to reduce the flow of air through the air duct, the valve further being located upstream of a point where the air duct joins the exhaust ventilation system; and a second valve located between the ventilation system and the air duct, the second valve operable to allow air to be drawn from the rest area through the rest area outlets and into the ventilation system.

10. The control system of claim 9, wherein the rest area is a flight attendant rest, crew rest, or passenger rest.

11. The control system of claim 10, further comprising a system controller in communication with the first valve and second valve to cause one or both of the first valve or second valve to at least partially open or close in response to a rest area environmental condition.

12. The control system of claims 11, further comprising a smoke or fire detector within the rest area and configured to provide a signal to the system controller when the detector detects the presence of smoke or fire in the rest area.

13. The control system of claim 12, wherein when the detector detects the presence of smoke or fire the system controller causes the first valve to substantially close and the second valve to substantially open so that air within the rest area is drawn through at least a portion of the air duct and into the ventilation system.

14. The control system of claim 13, further comprising a heater configured to heat the air between the first valve and the rest area, and a temperature controller within the rest area, the temperature controller being configured to control the operation of the heater.

15. The control system of claim 14, wherein the system controller causes the heater to turn off when the detector detects the presence of smoke or fire.

16. The control system of claim 15, further comprising a preheater configured to heat the air upstream of the first valve.

* * * * *